(12) United States Patent
Inada

(10) Patent No.: US 7,256,850 B2
(45) Date of Patent: Aug. 14, 2007

(54) REFLECTIVE LIQUID CRYSTAL DISPLAY DEVICE

(75) Inventor: Toshiya Inada, Kobe (JP)

(73) Assignee: TPO Hong Kong Limited, Shatin (HK)

( * ) Notice: Subject to any disclaimer, the term of this patent is extended or adjusted under 35 U.S.C. 154(b) by 374 days.

(21) Appl. No.: 10/148,046

(22) PCT Filed: Sep. 19, 2001

(86) PCT No.: PCT/EP01/10891

§ 371 (c)(1),
(2), (4) Date: May 24, 2002

(87) PCT Pub. No.: WO02/25360

PCT Pub. Date: Mar. 28, 2002

(65) Prior Publication Data

US 2002/0191132 A1 Dec. 19, 2002

(30) Foreign Application Priority Data

Sep. 25, 2000 (JP) ............................. 2000-291114

(51) Int. Cl.
*G02F 1/1343* (2006.01)
*G02F 1/1335* (2006.01)
(52) U.S. Cl. .................... 349/139; 349/113; 349/138
(58) Field of Classification Search ................ 349/113, 349/138–139, 110
See application file for complete search history.

(56) References Cited

U.S. PATENT DOCUMENTS 5,408,345 A * 4/1995 Mitsui et al. ................ 349/42

5,682,211 A * 10/1997 Yao et al. ................ 349/38

(Continued)

FOREIGN PATENT DOCUMENTS

EP 1 069 464 A2 1/2001

(Continued)

OTHER PUBLICATIONS

Patent Abstracts of Japan, Oodoi Yuuzou, "Reflection Type Liquid Crystal Display Device," Publication No. 09211493, Aug. 15, 1997, Application No. 08018641, May 2, 1996.

(Continued)

*Primary Examiner*—Toan Ton
(74) *Attorney, Agent, or Firm*—Birch, Stewart, Kolasch & Birch, LLP

(57) ABSTRACT

The object of the invention is to obtain a high contrast ratio and a better aperture ratio. The invention relates to a reflective liquid crystal display device comprises: a liquid crystal layer (3); a front base layer (5) and a rear base layer (1) which are located on both main surface sides of the liquid crystal layer; a transparent common electrode (4) supported by the front base layer (5); and a composite layer (2) supported by the rear base layer (1), which has a function of reflecting external light from a side of the front base layer (5) and a function of driving pixels, the composite layer (2) including electrically conductive bus-lines (22') which are arranged in matrix and are able to apply voltages for driving the pixels. The device is characterized in that the bus-lines (22') are formed from a material having a substantially low optical reflectivity.

19 Claims, 6 Drawing Sheets

U.S. PATENT DOCUMENTS

| | | | |
|---|---|---|---|
| 5,757,444 A * | 5/1998 | Takemura | 349/38 |
| 5,936,685 A * | 8/1999 | Ito et al. | 349/38 |
| 5,982,460 A * | 11/1999 | Zhang et al. | 349/39 |
| 6,417,901 B1 * | 7/2002 | Okada et al. | 349/113 |
| 6,515,719 B2 * | 2/2003 | Yamaguchi et al. | 349/38 |
| 6,515,720 B1 * | 2/2003 | Iizuka et al. | 349/39 |
| 6,583,840 B1 * | 6/2003 | Inoue et al. | 349/141 |
| 6,590,623 B2 * | 7/2003 | Ono et al. | 349/43 |
| 6,603,524 B1 * | 8/2003 | Shimada et al. | 349/139 |
| 6,624,857 B1 * | 9/2003 | Nagata et al. | 349/54 |
| 6,781,658 B1 * | 8/2004 | Choi | 349/139 |

FOREIGN PATENT DOCUMENTS

| | | |
|---|---|---|
| JP | 9-211493 | 8/1997 |
| JP | 10082991 | 3/1998 |

OTHER PUBLICATIONS

Patent Abstracts of Japan, Okuni Motohisa, "Reflection Type Liquid Crystal Display Device," Publication No. 09068718, Mar. 11, 1997, Application No. 07225559, Jan. 9, 1995.

* cited by examiner

|  60A | 60B | 60C |
| --- | --- | --- |
| JANUARY | FEBRUARY | MARCH |
| SITCOMS - 30 | BASEBALL - 1<br>BASKETBALL - 10<br>SITCOMS - 4 | DRAMAS - 12<br>SITCOMS - 10<br>BASKETBALL - 11<br>OPERA - 2 |
| <u>62A</u> | <u>62B</u> | <u>62C</u> |
| 30 SHOWS | 15 SHOWS | 35 SHOWS |
| 64A | 64B | 64C |

REFLECTIVE LIQUID CRYSTAL DISPLAY DEVICE

BACKGROUND OF THE INVENTION

1. Field of the Invention

The invention relates to a liquid crystal display device, and especially relates a reflective liquid crystal display device having at least a function of modulating and reflecting the external light in accordance with the image to be displayed so as to make image-displaying.

2. Description of Related Art

There is disclosed a technology to provide a transmissive liquid crystal display device with the so-called black matrix for covering unnecessary display portions other than the pixels in a publication of Japanese Patent Application Laid-Open No. 10548/98 (U.S. Pat. No. 5,956,103) and the like. In the publication, a light-shielding black matrix is provided to cover the unnecessary display portions, including two series of bus-lines (data signal lines and gate lines) disposed orthogonally to each other and a thin film transistor portion, so as to shield the light transmission in the area excluding pixel electrodes to hide the unnecessary display other than display in pixels. Accordingly, those unnecessary display portions have no influence on the image to be displayed. For example, even if the unnecessary portion behaves bad effect e.g. as if it is in a bright state while the image caused by the pixel (electrode) itself is in an extremely dark state (black displaying state), the bright state will not be engaged in display so as to contribute to increase of the contrast ratio.

However, when such a black matrix is disposed on a front side substrate of the concerned display panel, a region of the black matrix is intended to be arranged to be slightly wider so that the black matrix is prevented from going out of the light-shielded area in aligning the front side substrate with the rear side substrate. Therefore, such the region of the black matrix has a shape of overlapping with the border portions of the pixel electrodes in its plan view, which may deteriorate an aperture ratio of the display panel by the overlapping area.

Even in the case where the black matrix is disposed on the rear side substrate of the concerned display panel, the areas of the pixel electrodes are forcedly invaded more or less so as to be light-shielded reliably by the black matrix. Thus, the aperture ratio will be reduced.

Such a black matrix technology may be also applied to a reflective type liquid crystal display device. However, since the reflective type liquid crystal display device basically does not have a backlight system, the function of the black matrix for the reflective type is not so important as in the case of the transmissive type. As far as the reflective liquid crystal display device concerns, it may be more advantageous not to have a penalty of the aperture ratio by a scheme not to have a black matrix that may invade pixel electrodes. This is because the reflective type display device is to display the image by means of reflecting the external light, so the maximized reflection of the light certainly conveying the image is inherently important, and accordingly it is a fundamental mission for the reflective type display device to make effective use of the externally incident light for bright display.

However, in order to provide the better reflective type of liquid crystal display devices, the aforementioned influence of the unnecessary display portions can not be ignored. For the reflective liquid crystal display device, in the unnecessary display portions, particularly the above-mentioned portion of the two series of bus-lines, an electric potential difference caused between the buss-line and the opposing (common) electrode may undesirably drive a liquid crystal portion existing there between. As a result, the contrast ratio may be reduced, for example, the undesirably driven liquid crystal portion may leak the light during the black displaying so that images which should have been darkly displayed are made brightened.

SUMMARY OF THE INVENTION

From viewpoints of the above, it is an object of the invention to provide a reflective type liquid crystal display device which can contribute to improving the contrast ratio.

It is another object of the invention to provide a structure suitably applied to the reflective type liquid crystal display device which can contribute to improving the contrast ratio without sacrificing the aperture ratio.

It is a further object of the invention to provide a reflective type liquid crystal display device which can contribute to improving the contrast ratio as well as the aperture ratio.

In order to achieve the aforementioned objects, a reflective liquid crystal display device according to one aspect of the invention is a reflective liquid crystal display device comprising: a liquid crystal layer; a front base layer and a back base layer which are located on both main surface sides of the liquid crystal layer; a transparent common electrode supported by the front base layer; and a composite layer supported by the back base layer, which has a function of reflecting external light from a side of the front base layer and a function of driving pixels, the composite layer including electrically conductive bus-lines which are arranged in matrix and are able to apply voltages for driving the pixels, CHARACTERIZED in that the bus-lines are formed from a material substantially having optical low reflectivity.

According to this aspect, even if the liquid crystal portion sandwiched by the common electrode and the bus-line is driven unnecessarily by a voltage occurring thereacross (driven to a light-transmissive state, for example), the bus-lines having the above-mentioned property can absorb, transmit or scatter the incident light coming into the concerned liquid crystal portion so that the light may not be directly reflected or may almost never be directly reflected to the outside (the front side). Thus, there is no influence upon the black displayed image based on the pixel electrodes located adjacently to the concerned liquid crystal portion. As a result of this, a good black display can be obtained with no light leakage, and the contrast ratio of the display panel can be improved.

In the above-mentioned display device, the bus-lines may be formed from a material substantially having optical absorbency, optical transmissivity or optical scattering property.

Besides, the composite layer may comprise pixel electrodes and such a structure that the composite layer causes the pixel electrodes and the common electrode to apply a voltage to the liquid crystal layer for each pixel in accordance with signals supplied to the bus-lines.

Moreover, the pixel electrodes preferably have a function of reflecting external light from a side of the front base layer.

Another aspect of the invention in order to achieve the aforementioned objects provides a reflective liquid crystal display device comprising: a liquid crystal layer; a front base layer and a back base layer which are located on both main surface sides of the liquid crystal layer; a transparent common electrode supported by the front base layer; and a composite layer supported by the back base layer, which has a function of reflecting external light from a side of the front base layer and a function of driving pixels, the composite layer including electrically conductive bus-lines which are arranged in matrix and are able to apply voltages for driving the pixels, and including an insulating layer covering the bus-lines, CHARACTERIZED in that the insulating layer is formed from a material which does not substantially have optical direct-reflecting property but substantially has optical non-transmissivity.

By means of the insulating layer having the above-mentioned property, even if the liquid crystal portion sandwiched by the common electrode and the bus-line is driven unnecessarily by a voltage occurring thereacross (driven to a light-transmissive state, for example), the insulating layer can absorb or scatter the incident light coming into the concerned liquid crystal portion so that the light may not be directly reflected or may almost never be directly reflected to the outside (the front side). Thus, there exists no influence upon the black display image based on the pixel electrodes located adjacently to the concerned liquid crystal portion. As a result, a good black display with no light leakage can be obtained, and the contrast ratio of the display panel can be improved.

In the above-mentioned display device, the insulating layer may be formed from a material substantially having optical absorbency or optical scattering property.

Besides, the composite layer may have pixel electrodes and such a structure that the composite layer causes the pixel electrodes and the common electrode to apply a voltage to the liquid crystal layer for each pixel in accordance with signals supplied to the bus-lines.

Preferably, the pixel electrodes may have a function of reflecting external light from a side of the front base layer.

A further aspect of the invention for achieving the aforementioned objects provides a reflective liquid crystal display device comprising: a liquid crystal layer; a front base layer and a back base layer which are located on both main surface sides of the liquid crystal layer; a transparent common electrode supported by the front base layer; and a composite layer supported by the back base layer, which has a function of reflecting external light from a side of the front base layer and a function of driving pixels, the composite layer including electrically conductive bus-lines which are arranged in matrix and are able to apply voltages for driving the pixels, CHARACTERIZED in that: the display device further comprises a coat layer stacked on the bus-lines via an insulating layer; and the coat layer is formed from a material which does not substantially have optical direct-reflecting property but substantially has optical non-transmissivity.

By this structure, even if the liquid crystal portion sandwiched by the common electrode and the bus-line is driven unnecessarily by a voltage occurring thereacross (driven to a light-transmissive state, for example), the coat layer having the above-mentioned property can absorb or scatter the incident light coming into the concerned liquid crystal portion so that the light may not be directly reflected or may almost never be directly reflected to the outside (the front side). Therefore, this structure can contribute to improving the contrast ratio, too.

In this display device, the coat layer may be formed from a material substantially having optical absorbency or optical scattering property.

Besides, the composite layer may have pixel electrodes and such a structure that the composite layer causes the pixel electrodes and the common electrode to apply a voltage to the liquid crystal layer for each pixel in accordance with signals supplied to the bus-lines.

Moreover, the pixel electrodes may also preferably have a function of reflecting the external light from a side of the front base layer.

A further aspect of the invention for accomplishing the aforementioned objects provides a reflective liquid crystal display device comprising: a liquid crystal layer; a front base layer and a back base layer which are located on both main surface sides of the liquid crystal layer; a transparent common electrode supported by the front base layer; and a composite layer supported by the back base layer, which has a function of reflecting external light from a side of the front base layer and a function of driving pixels, the composite layer including: electrically conductive bus-lines which are arranged in matrix and are able to apply voltages for driving the pixels; an insulating layer covering the bus-lines; and pixel electrodes for applying a voltage to the liquid crystal layer for each pixel in accordance with signals supplied to the bus-lines, CHARACTERIZED in that the pixel electrodes are stacked on the bus-line via the insulating layer.

By virtue of this, since the electric potential of the buss-line is shielded against the liquid crystal layer by the pixel electrodes, the liquid crystal portion corresponding to the covered bus-line portions may not behave to unfavorably influence the contrast ratio because that portions are driven only by the concerned pixel electrodes. In addition, resultingly the areas of the pixel electrodes can be favorably increased, which contributes to improving the aperture ratio.

In the display device, the bus-lines may be formed from a material substantially having optical low reflectivity.

Besides, the insulating layer may be formed from a material which does not substantially have optical direct-reflecting property but substantially has optical non-transmissivity.

The display device may further comprise a coat layer stacked on the bus-line via the insulating layer in an area of part of the bus-line, on which the pixel electrodes are not covered, and the coat layer may be formed from a material which does not substantially have optical direct-reflecting property but substantially has optical non-transmissivity.

DESCRIPTION OF THE PREFERRED EMBODIMENT(S)

Figure 1:
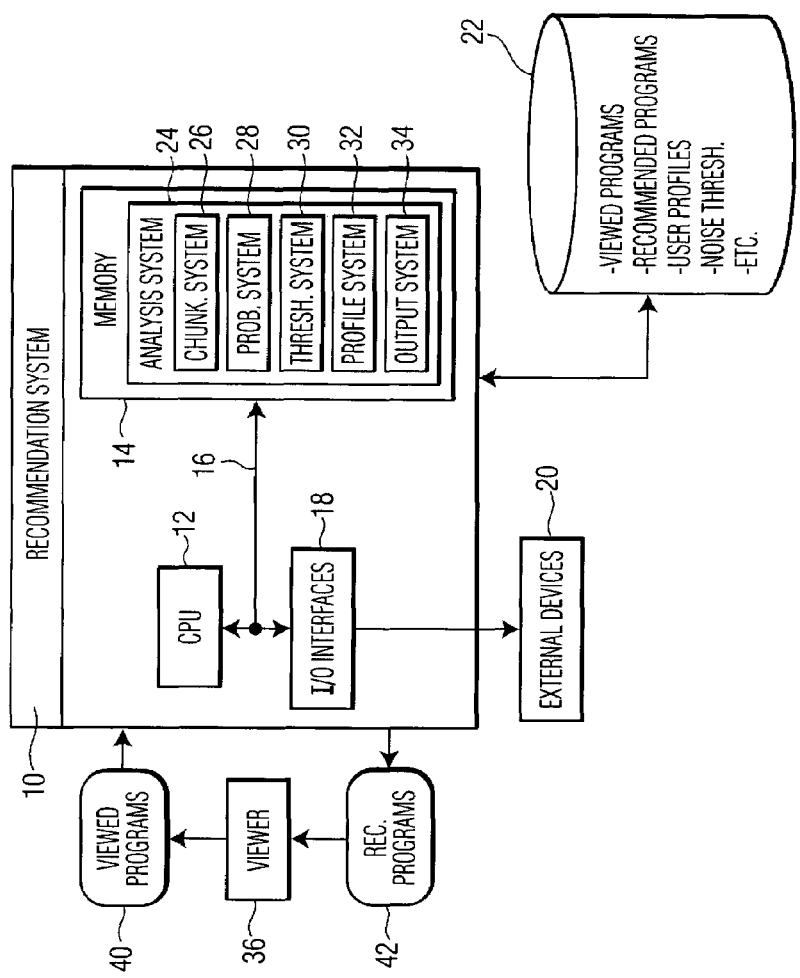
FIG. 1 is a sectional view schematically showing a part of the display panel structure of a reflective liquid crystal display device in accordance with the first embodiment of the invention.
Figures 2A, 2B:
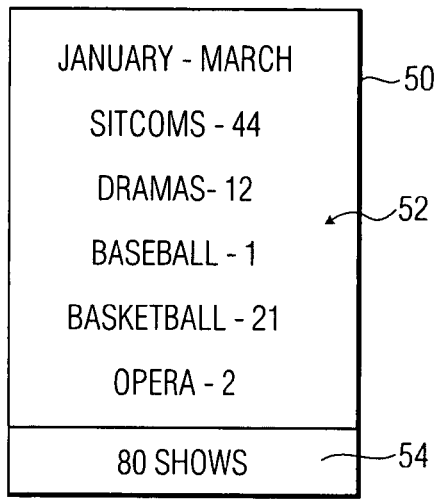
FIG. 2 is a sectional view schematically showing a part of the display panel structure of a reflective liquid crystal display device in accordance with the second embodiment of the invention.

FIG. 1 schematically shows a partial sectional-structure of the display panel of a reflective liquid crystal display device according to the first embodiment of the invention.

The display panel 100 in FIG. 1 comprises a rear side substrate 1 as one base layer. On the substrate 1, there is provided a composite layer 2 that comprises an insulating layer 21, a plurality of TFTs (thin film transistors), not shown, formed in association with pixels, source and gate bus-lines 22' to which pixel information signals and scanning line control signals are supplied for driving the TFTs and pixel electrodes 23 which are respectively connected to the drain electrodes of the TFFs. The display panel 100 also comprises a liquid crystal layer 3 located above the composite layer 2. The display panel 100 further comprises a transparent front side substrate 5 as another base layer which sandwiches the liquid crystal layer 3 with the substrate 1. The front side substrate 5 is formed from e.g. glass. A transparent common electrode 4 is formed all over the front side substrate 5. The substrate 5 is provided with a color filter (not shown herein). Besides, a polarizing plate 6 is attached to one front side principal plane of the substrate 5.

The pixel electrodes 23 are formed from a light-reflective material in this embodiment, and have not only a function of applying voltages according to the pixels' information to be displayed to the liquid crystal layer 3 but also a function of reflecting the external light coming from the front side. This enables these pixel electrodes and the corresponding liquid crystal portion to optically modulating the coming external light in accordance with the image and to optically reflecting for displaying the modulated result on the front side.

In this structure, the liquid crystal portion 7 between the bus-lines 22' and the common electrode 4 may be undesirably driven by the voltage that may occur thereacross. As a result, the contrast ratio may be deteriorated as mentioned above.

So, in this embodiment, the bus-lines 22' are formed from a material that has electrical conductivity but has a low optical reflectivity. "Low optical reflectivity" herein refers to low optical direct-reflecting property, that is, a property including characteristics regarding optical absorbency, optical transmissivity and optical scattering property.

By virtue of the bus-lines having such a property, even if the liquid crystal portion 7 is unnecessarily driven by a voltage between them sandwiching it (for example, driven to a light-transmissive state), the bus-lines 22' absorb, transmit or scatter the light incident on the liquid crystal portion 7 so that the incident light may not be directly reflected or may almost never be reflected to the outside (the front side). Thus, there is no influence upon the black displayed image based on the neighbor pixel electrode. As a result, a good black display with no light leakage can be obtained, and the contrast ratio of the display panel can be improved.

It should be noted that the insulating layer 21 in this embodiment is transparent.

Figure 2:
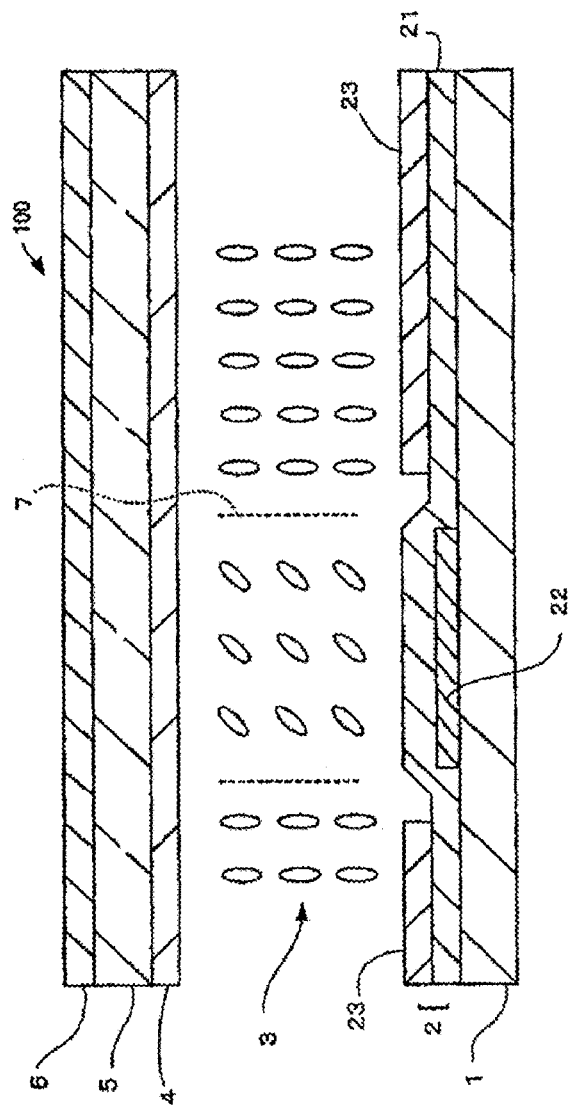
Figure 3:
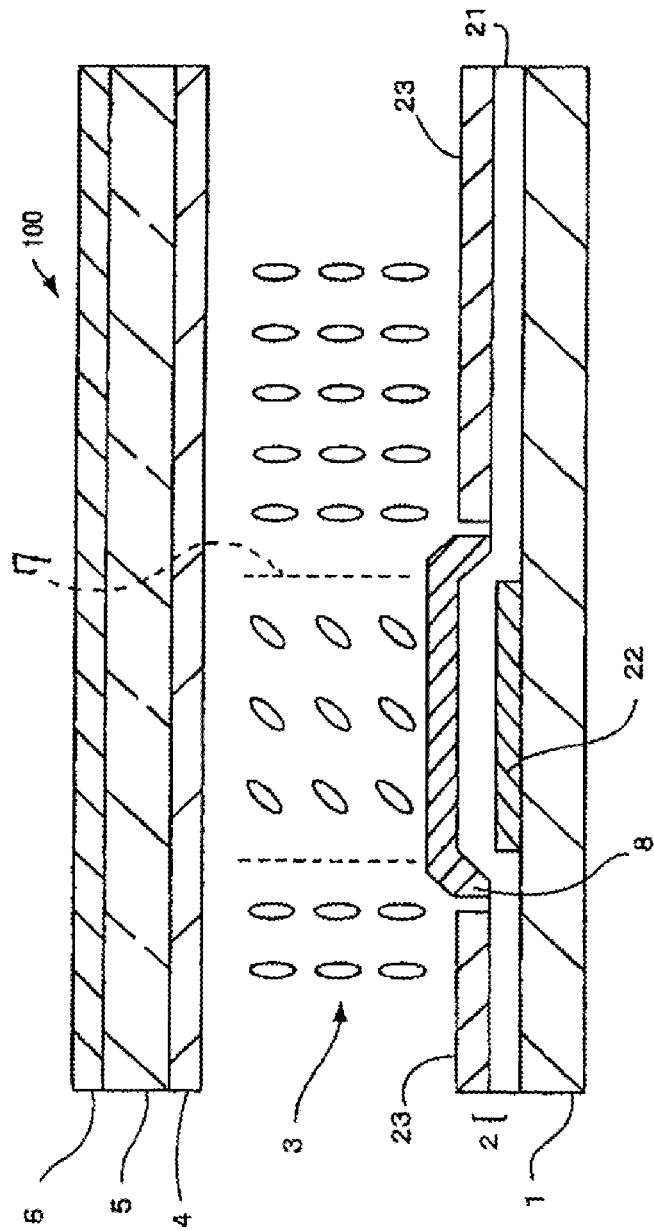
Figure 4:
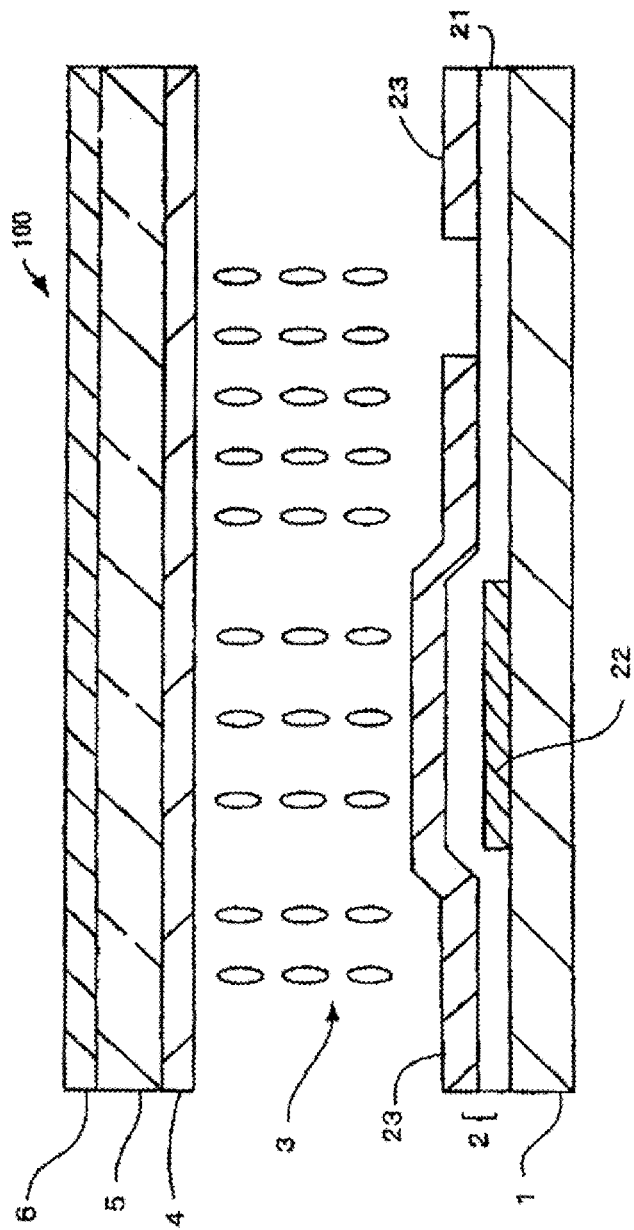
Figure 5:
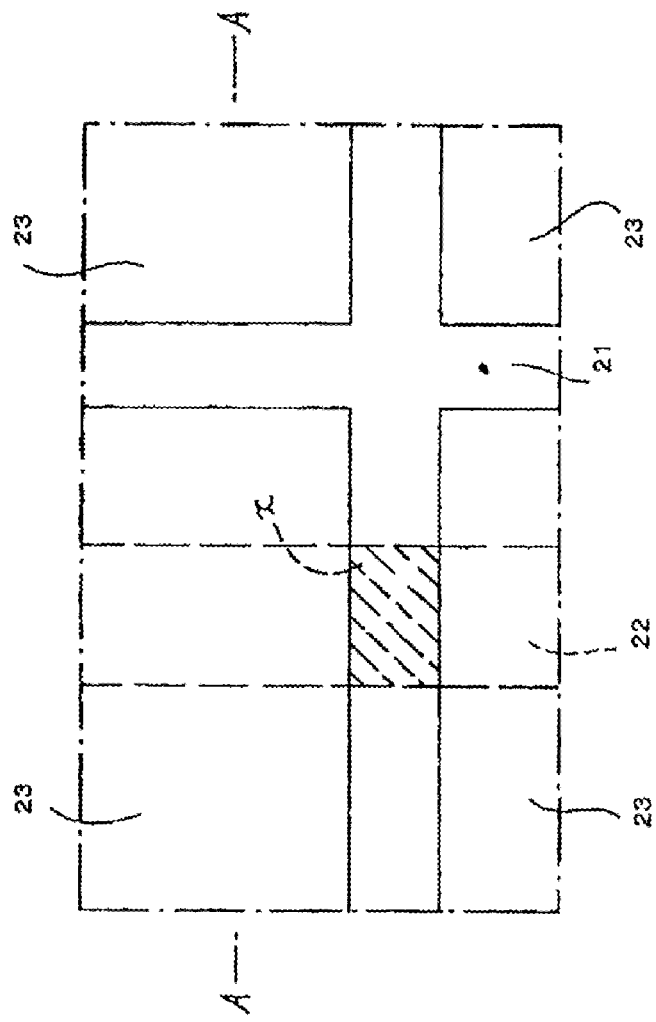
Figure 6:
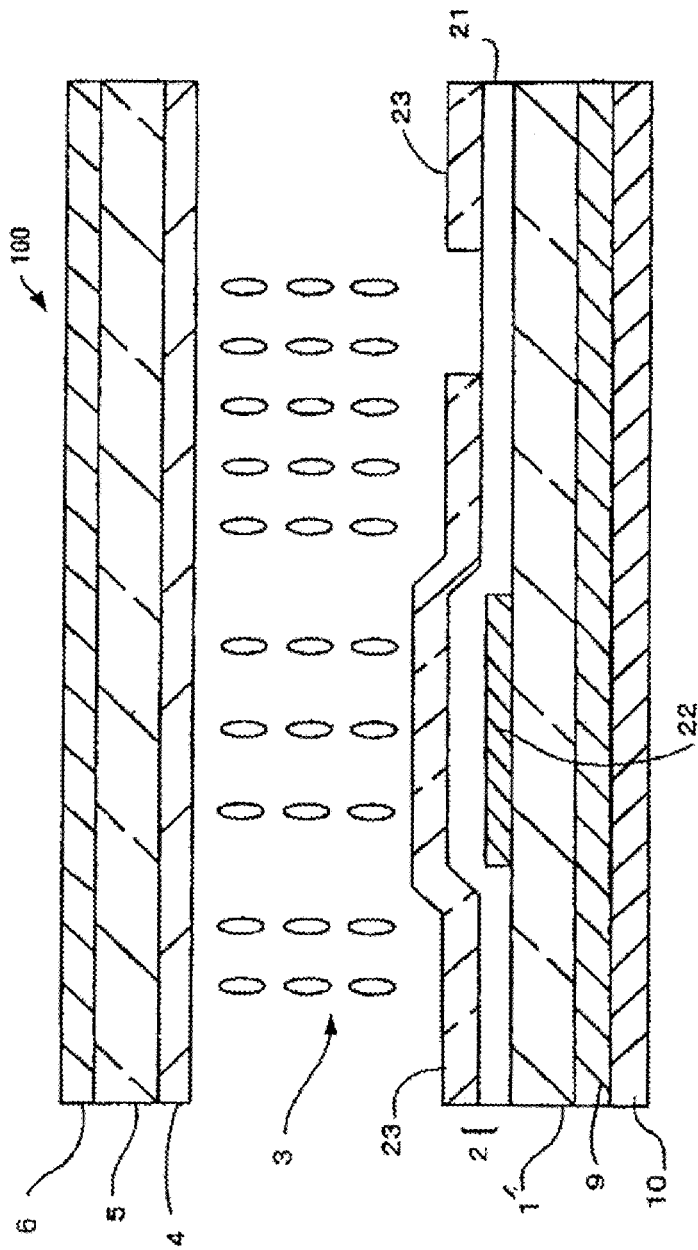
Figure 2:
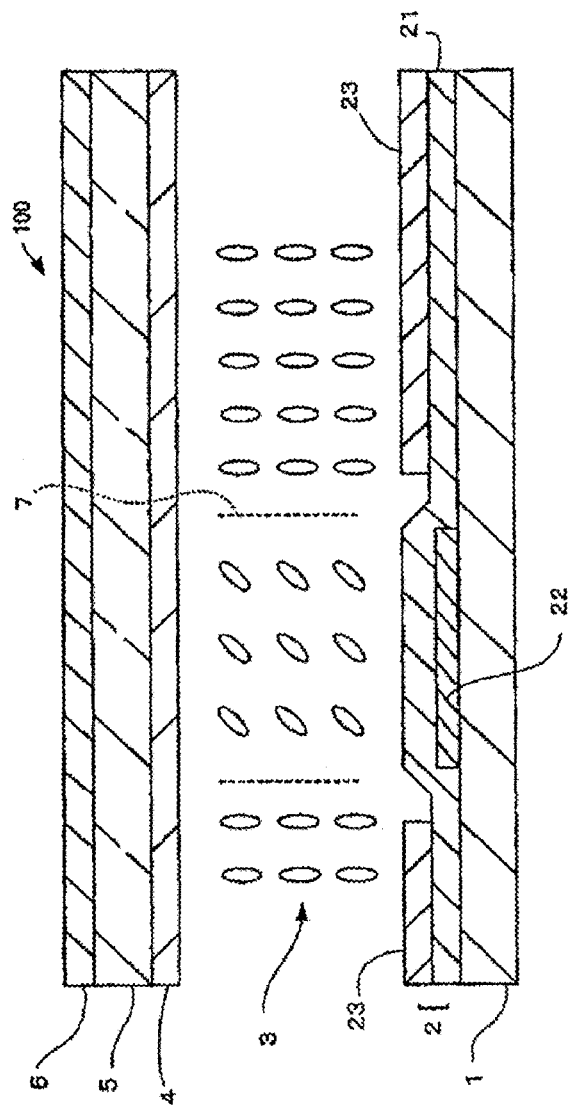
Figure 3:
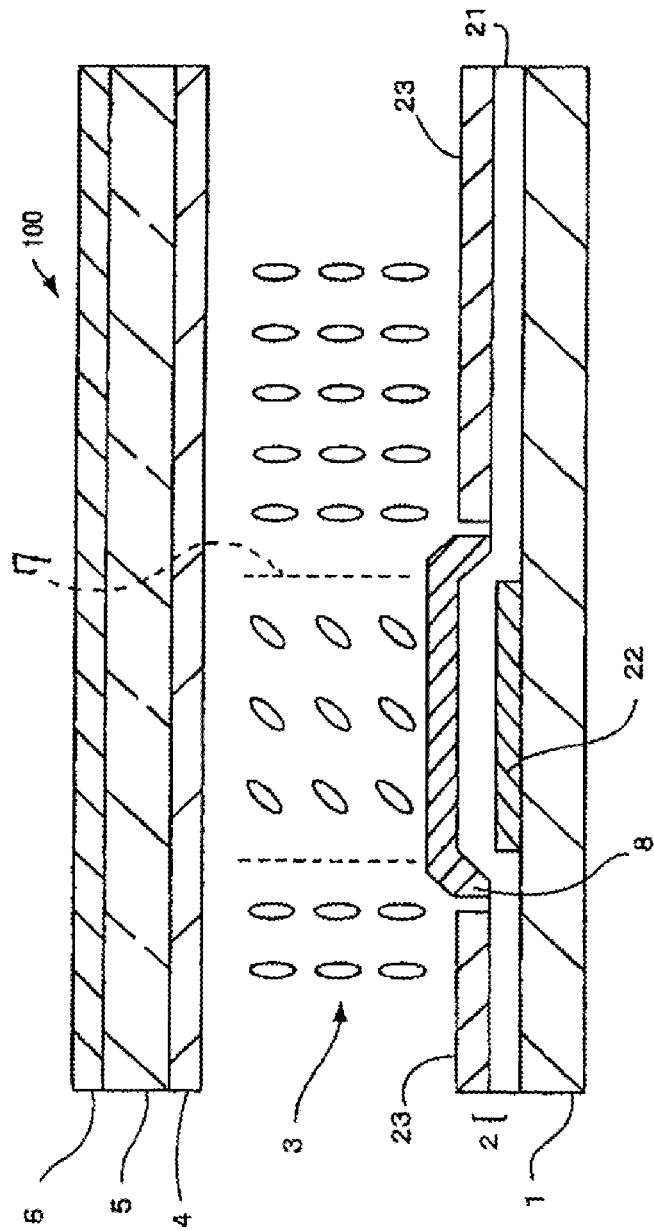
Figure 4:
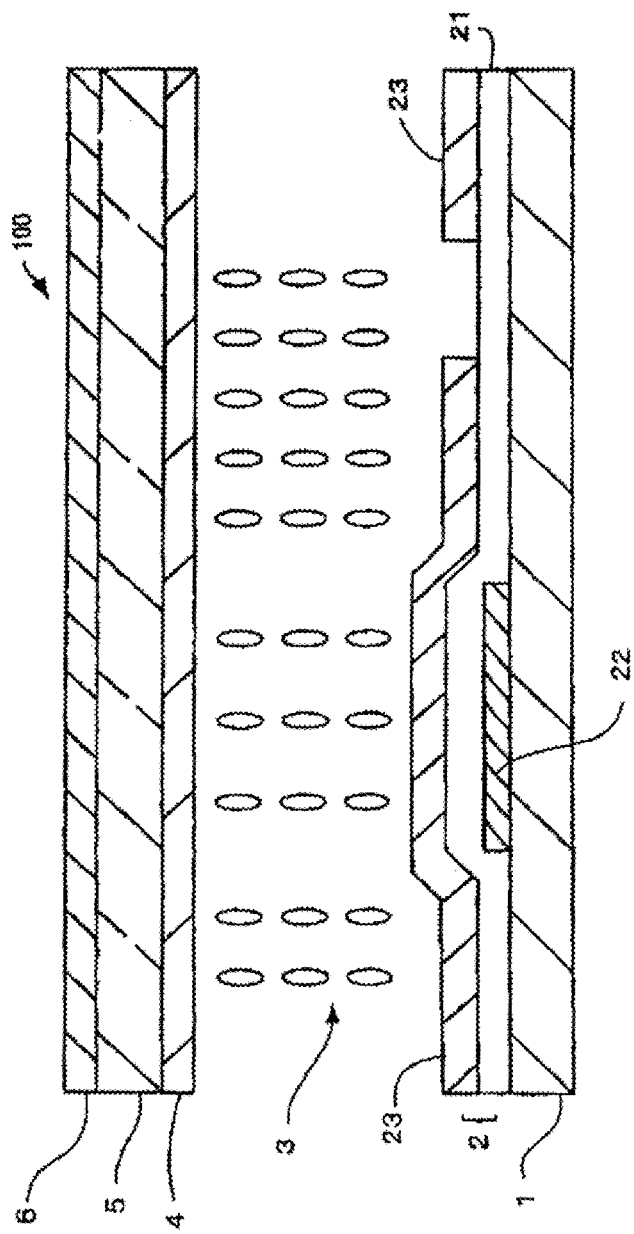
Figure 5:
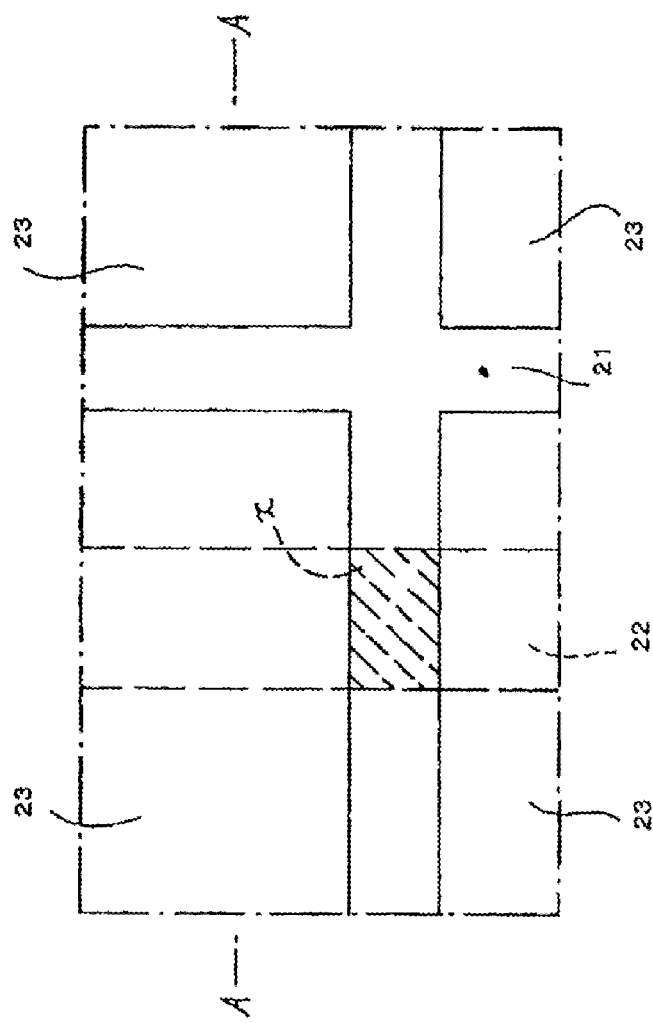
Figure 6:
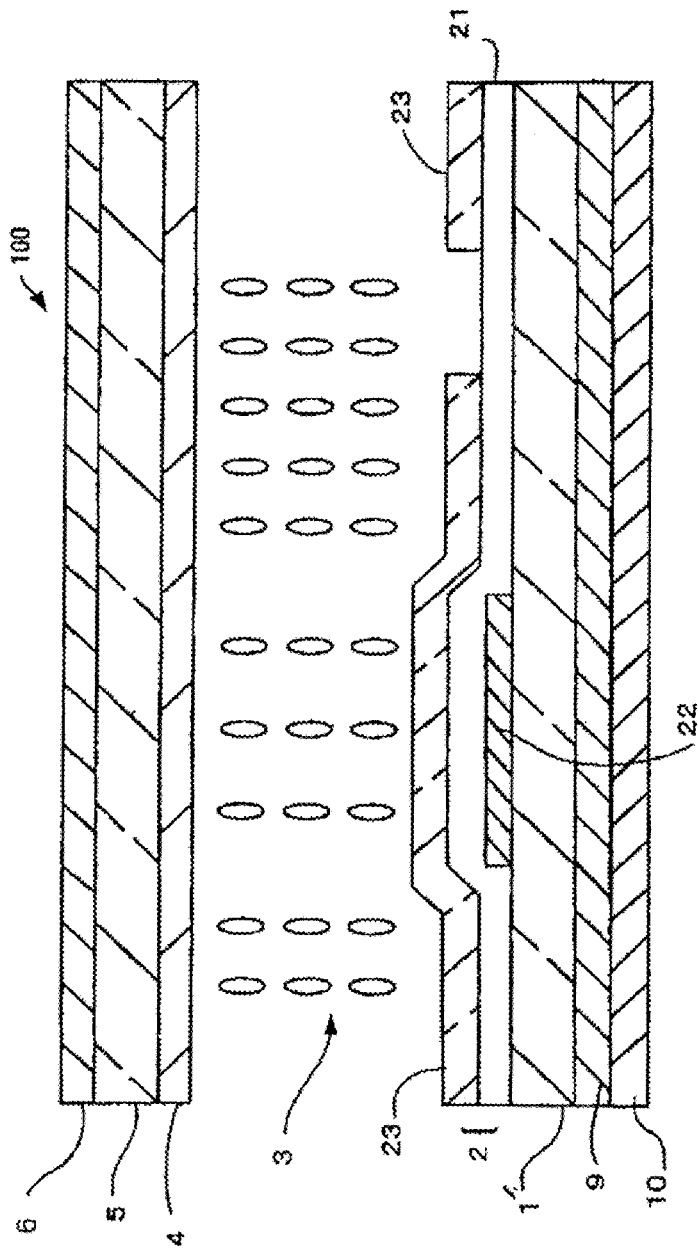

FIG. 2 shows a cross-sectional structure of a part of the display panel of a reflective liquid crystal display device of the second embodiment according to the invention.

The difference in structure of FIG. 2 from FIG. 1 is that the insulating layer 21' covering the bus-lines 22 is formed from a material which has no optical direct-reflecting property but has an optical non-transmissive property while the bus-lines 22 leave formed from a reflective material as usual. The material property for the insulating layer 21' herein specifically means optical absorbency or optical scattering property.

By virtue of the insulating layer having such a property, even if the liquid crystal portion 7 is driven unnecessarily by an voltage occurring thereacross (for example, driven to a light-transmissive state), the insulating layer 21' can absorb or scatter the incident light coming into the concerned liquid crystal portion so that the incident light may not be directly reflected or may almost never be directly reflected to the outside (the front side). Thus, there exists no influence upon the black displayed image based on the neighbor pixel electrodes. As a result, a good black display with no light leakage can be obtained, and contrast ratio of the display panel can be improved.

It is noted that the reason why the property of the insulating layer 21' does not include an optical transmission property is that if the insulating layer is transmissive and the bus-lines are optically reflective, the external light may be allowed to enter into the bus-lines 22 due to unnecessary driving of the liquid crystal portion and then the incident external light at the bus-lines may be reflected toward the front side, which may bring out some influence on the display.

Figure 3:
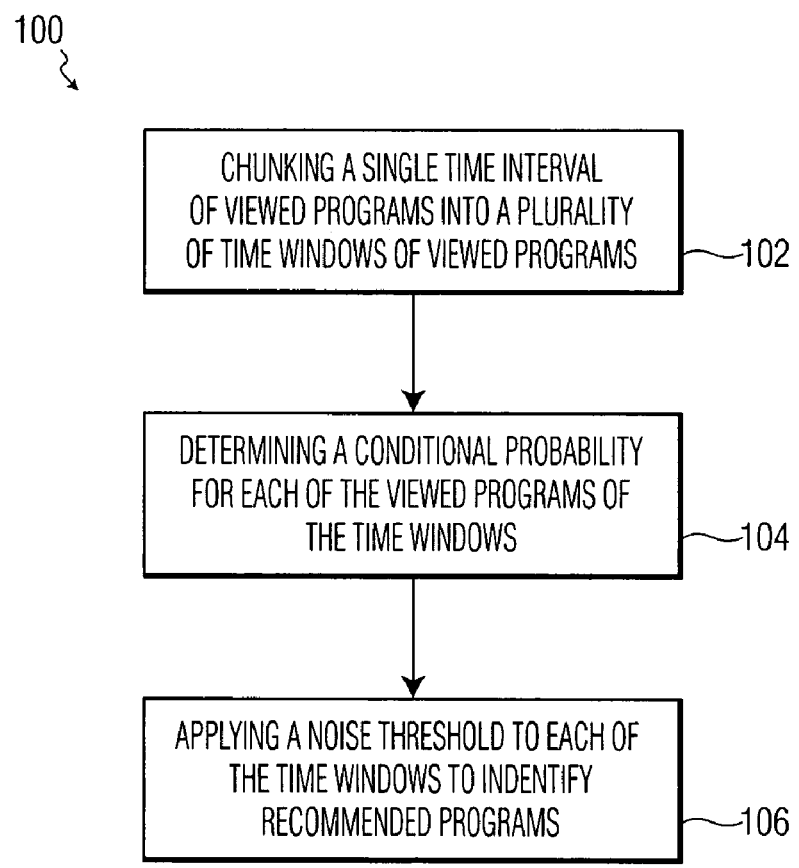
FIG. 3 is a sectional view schematically showing a part of the display panel structure of a reflective liquid crystal display device in accordance with the third embodiment of the invention.

FIG. 3 shows a cross-sectional structure of a part of the display panel of a reflective liquid crystal display device of the third embodiment according to the invention.

The difference in structure of FIG. 3 from FIG. 1 is that: although the bus-lines 22 leave formed from a reflective material as usual, a coat layer 8 stacked on the insulating layer 21 and covering the bus-lines 22 is formed, the coat layer being formed from a material which does not have an optical direct-reflecting property and has optical non-transmissivity. The material property for the coat layer 8 herein specifically means optical absorbency or light scattering property.

By virtue of the coat layer 8 having such a property, even if the liquid crystal portion 7 is driven unnecessarily by a voltage occurring thereacross (driven to a light-transmissive state, for example), the coat layer 8 can absorb or scatter the incident light coming into the concerned liquid crystal portion so that the incident light may not be directly reflected or may substantially never be directly reflected to the outside (the front side). Thus, this structure can also contribute to improving the contrast ratio, similarly, It is noted that the reason why the property of the coat layer 8 does not include optical transmissivity is that: for example, if the bus-lines 22 are optically reflective and the insulating layer 21 is optically transmissive, the external light may be allowed to enter into the bus-lines 22 due to unnecessary driving of the liquid crystal portion, whereby the incident external light at the bus-lines may be reflected toward the front side and may influence the display.

Figure 4:
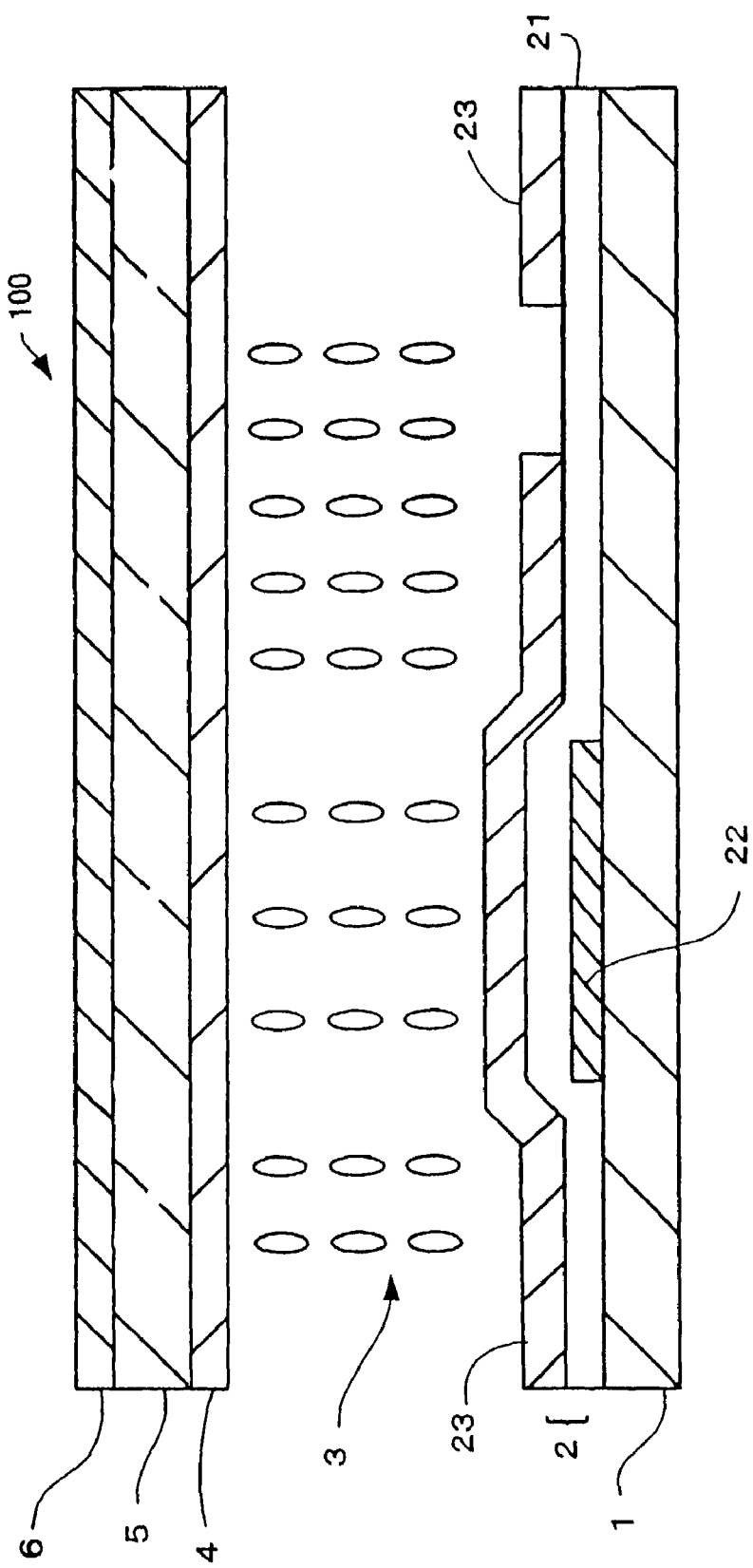
FIG. 4 is a sectional view schematically showing a part of the display panel structure of a reflective liquid crystal display device in accordance with the fourth embodiment of the invention.
Figure 5:
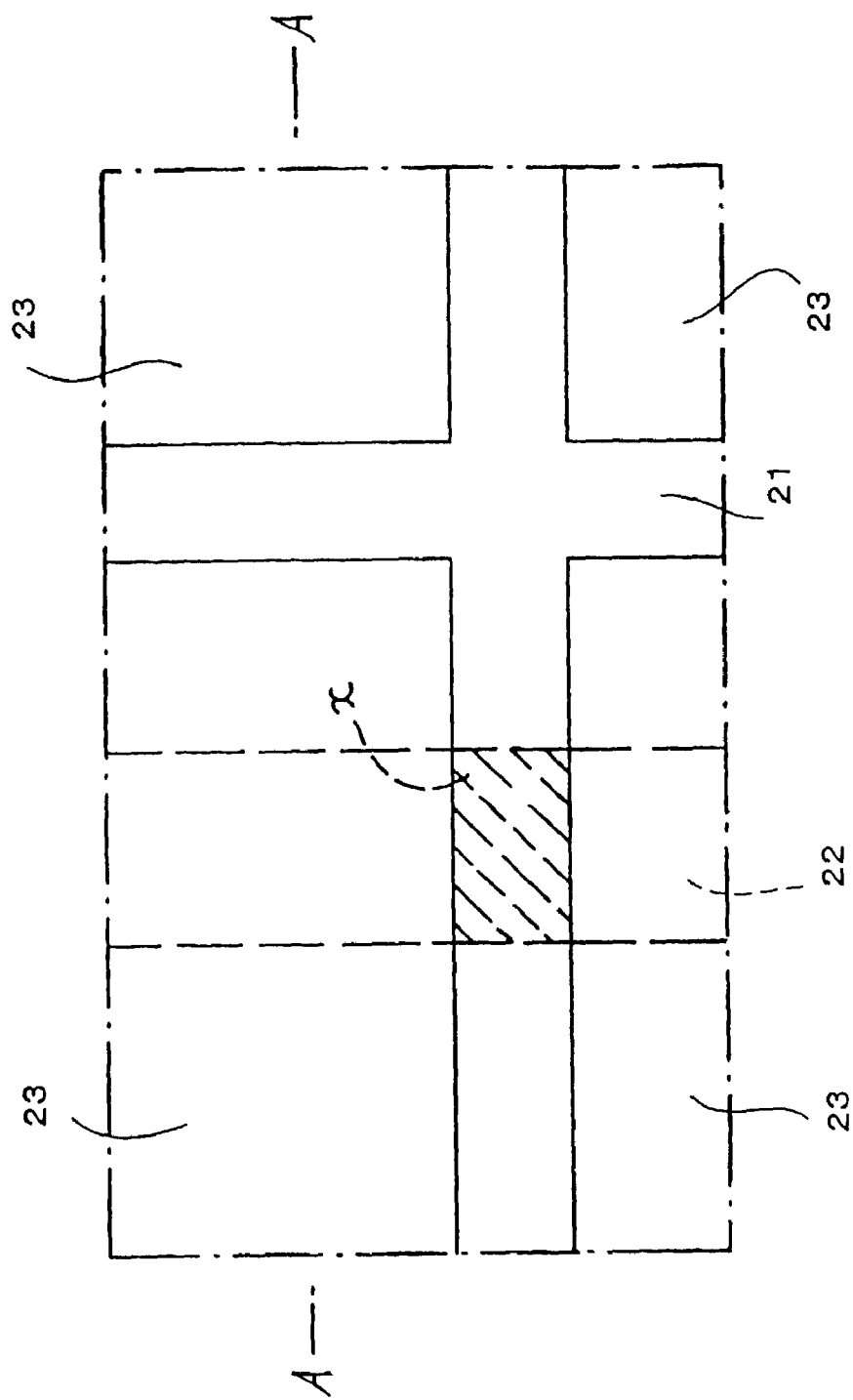
FIG. 5 is a plan view corresponding to the structure illustrated in FIG. 4.

FIG. 4 shows a cross-sectional structure of a part of the display panel of a reflective liquid crystal display device of the fourth embodiment according to the invention, and FIG. 5 is a plan view corresponding to the structure illustrated in FIG. 4 (a cross section of the portion broken by the line A-A in FIG. 5 is shown in FIG. 4).

The difference in structure of FIG. 4 from FIG. 1 is that: although the bus-lines 22 leave formed as usual, the pixel electrodes 23 are extended in such a manner that they step over (straddle) and cover the bus-lines 22. Namely, as also shown in FIG. 5, the pixel electrode 23 which is located adjacently on the right, left, front or rear side of the bus-lines 22 is formed so as to cover the bus-lines 22. Thus, in comparison with the structure of FIG. 1, an area occupied by the pixel electrodes 23 is expanded proportionally to such stepping-over portion.

By virtue of the pixel electrodes 23 of such formation, most of the liquid crystal portion 7 that is unnecessarily driven as described above may disappear. Namely, since the electric potential of the buss-lines 22 is shielded by the pixel electrodes 23 that cover the bus-lines, the liquid crystal portion corresponding to the covered bus-line portion may not be driven at all by the potential. Thus, the liquid crystal portion which may be unnecessarily driven can be minimized and the contrast ratio of the display panel can be improved.

Besides, since the liquid crystal portion corresponding to the covered bus-line portion is driven only by the pixel electrodes, the areas of the pixel electrodes can be resultantly increased, so that a higher aperture ratio can be advantageously obtained.

It should be noted that a bus-line portion x which may not be covered by the pixel electrodes 23 remains as shown in FIG. 5 in this embodiment. This portion x may a portion to unnecessarily drive the corresponding liquid crystal portion. In fact, it is possible to get an enough advantage regarding a contrast ratio and an aperture ratio even if the portion x, remains, but a further improvement can be obtained if this embodiment is further arranged so as to include the features described in conjunction with the other embodiments shown in FIG. 1 through FIG. 3. In particular, improvement can be made easily and effectively by means of adopting an insulating layer 21' having optical absorbency or light scattering property or of adopting an optical absorbing or light-scattering coat layer 8 stacked in association with the portion x.

Figure 6:
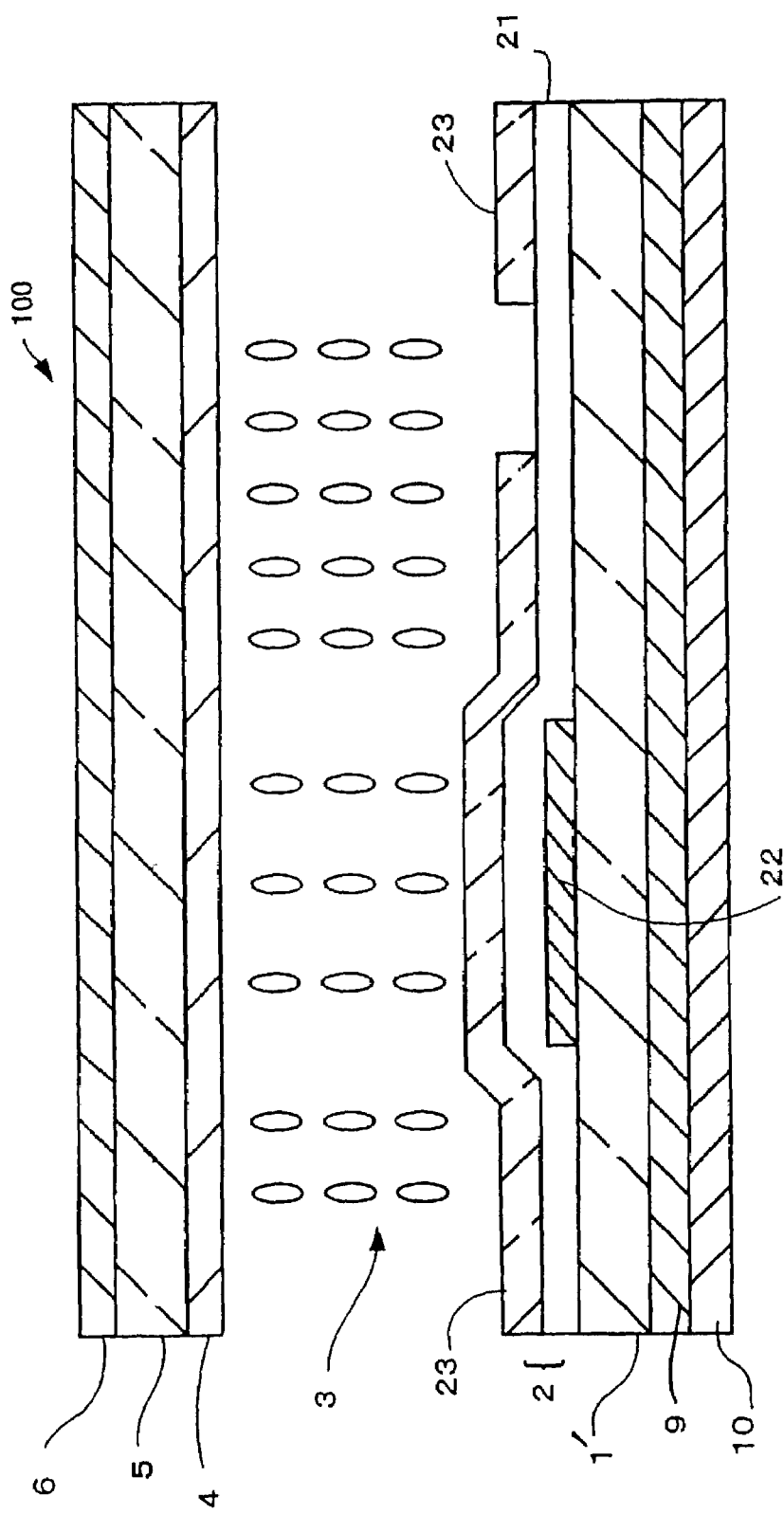
FIG. 6 is a sectional view schematically showing a part of the display panel structure of a reflective liquid crystal display device in accordance with the fifth embodiment of the invention.
Figure 1:
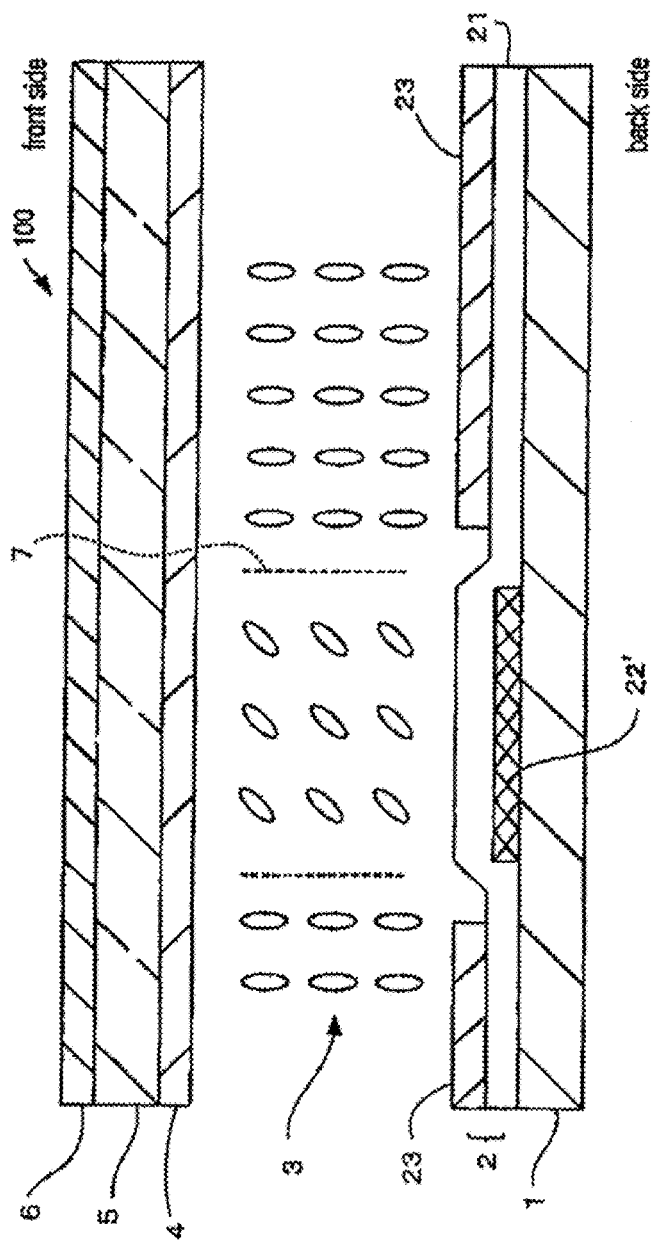

FIG. 6 schematically shows a cross-sectional structure of a part of the display panel of a reflective liquid crystal display device of the fifth embodiment according to the invention.

The essential difference in structure of FIG. 6 from FIG. 1 is that the pixel electrodes 23 are optically transmissive and a separate optical reflective layer 10 is provided at the back side of the display panel. For this kind of structure, the rear side substrate 1' needs to be transparent and another polarizing plate 9 is disposed between the reflective layer 10 and the substrate 1'. This structure may be called a dual polarizing plate type of reflective liquid crystal display device, whereas the structure shown in FIGS. 1-5 may be called a single polarizing plate type of reflective liquid crystal display device. The reflecting layer 10 should be regarded as a part of the aforementioned composite layer 2.

The aforementioned features which are peculiar to the invention can be also applied to this embodiment of the liquid crystal display device and the equivalent effects/advantages can be expected as well.

Notably, it is of course that the features described in each of the aforementioned embodiments can be appropriately combined with each other or all together.

Besides the invention is not intended to exclude a reflective type liquid crystal display device that comprises the so-called front-light system.

Thus, the preferable embodiments disclosed in this specification are for the exemplary purpose and are not limitative examples. The scope of the invention is defined by the claims, and accordingly all variations falling within the meanings of those claims should be included in the invention.

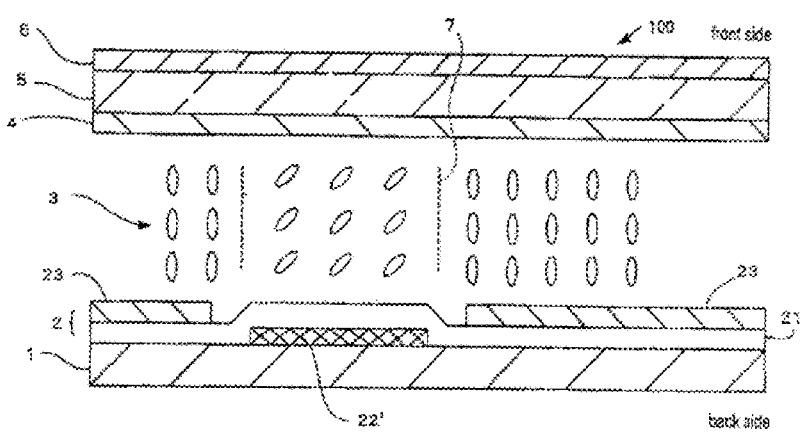

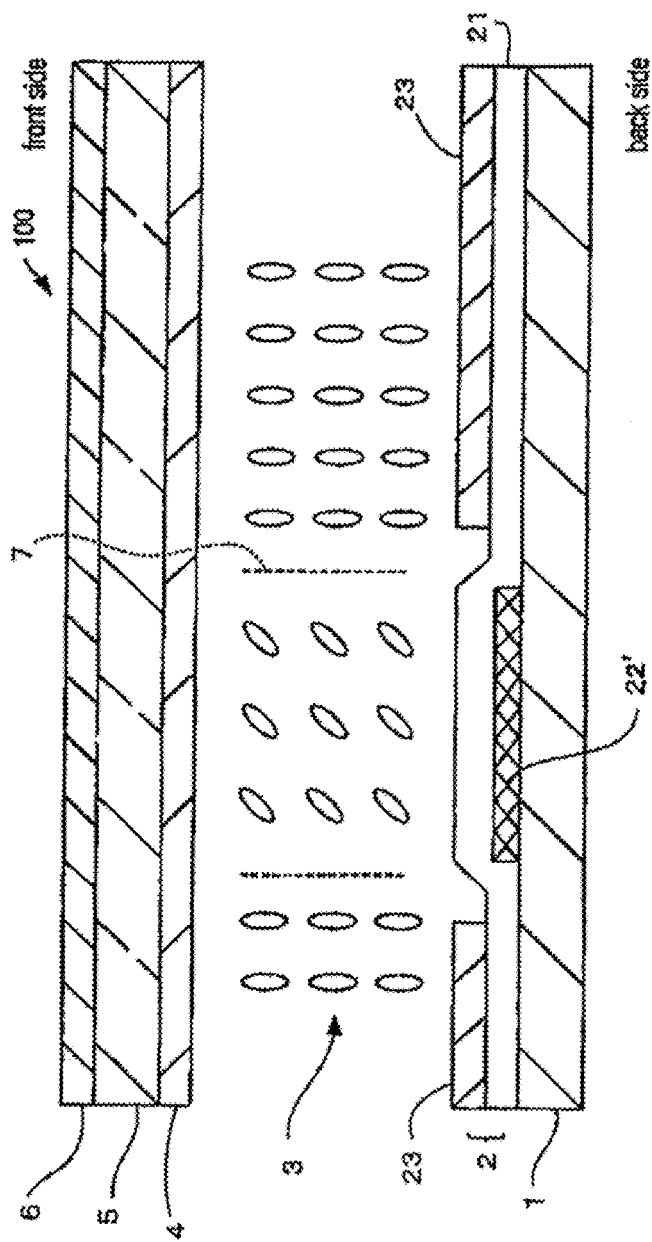

The invention claimed is:

1. A reflective liquid crystal display device comprising:
a liquid crystal layer;
a front base layer and a back base layer which are located on both main surface sides of the liquid crystal layer;
a transparent common electrode supported by the front base layer; and
a composite layer supported by the back base layer, which has a function of reflecting external light from a side of the front base layer and a function of driving pixels,
the composite layer including electrically conductive bus-lines which are arranged in matrix and are able to apply voltages for driving the pixels,
wherein the bus-lines are formed from a material substantially having optical low reflectivity and which is substantially optically absorbent or substantially optically scattering.

2. The display device of claim 1, wherein the composite layer comprises pixel electrodes and such a structure that the composite layer causes the pixel electrodes and the common electrode to apply a voltage to the liquid crystal layer for each pixel in accordance with signals supplied to the bus-lines.

3. The display device of claim 2, wherein the pixel electrodes have a function of reflecting external light from a side of the front base layer.

4. A reflective liquid crystal display device comprising:
a liquid crystal layer;
a front base layer and a back base layer which are located on both main surface sides of the liquid crystal layer;
a transparent common electrode supported by the front base layer; and
a composite layer supported by the back base layer, which has a function of reflecting external light from a side of the front base layer and a function of driving pixels,
the composite layer including electrically conductive bus-lines which are arranged in matrix and are able to apply voltages for driving the pixels, and including an insulating layer covering the bus-lines and pixel electrodes for applying a voltage to the liquid crystal layer for each pixel in accordance with signals supplied to the bus-lines,
wherein the insulating layer is formed from a material which does not substantially have optical direct-reflecting property but substantially has optical non-transmissivity, and
wherein the pixel electrodes each extend across an entire width of one of the bus-lines via the insulating layer.

5. The display device of claim 4, wherein the insulating layer is formed from a material substantially having optical absorbency or optical scattering property.

6. The display device of claim 4, wherein the pixel electrodes have a function of reflecting external light from a side of the front base layer.

7. The display device of claim 5, wherein the composite layer has pixel electrodes and such a structure that the composite layer causes the pixel electrodes and the common electrode to apply a voltage to the liquid crystal layer for each pixel in accordance with signals supplied to the bus-lines.

8. The display device of claim 7, wherein the pixel electrodes have a function of reflecting external light from a side of the front base layer.

9. A reflective liquid crystal display device comprising:
a liquid crystal layer;
a front base layer and a back base layer which are located on both main surface sides of the liquid crystal layer;

a transparent common electrode supported by the front base layer; and a composite layer supported by the back base layer, which has a function of reflecting external light from a side of the front base layer and a function of driving pixels, the composite layer including electrically conductive bus-lines which are arranged in matrix and are able to apply voltages for driving the pixels and pixel electrodes for applying a voltage to the liquid crystal layer for each pixel in accordance with signals supplied to the bus-lines, wherein:

the display device further comprises a coat layer stacked on the bus-lines via an insulating layer;

the coat layer is formed from a material which does not substantially have optical direct-reflecting property but substantially has optical non-transmissivity, and wherein the pixel electrodes each extend across an entire width of one of the bus-lines via the insulating layer.

10. The display device of claim 9, wherein the coat layer is formed from a material substantially having optical absorbency or optical scattering property.

11. The display device of claim 9, wherein the pixel electrodes have a function of reflecting external light from a side of the front base layer.

12. The display device of claim 10, wherein the composite layer has pixel electrodes and such a structure that the composite layer causes the pixel electrodes and the common electrode to apply a voltage to the liquid crystal layer for each pixel in accordance with signals supplied to the bus-lines.

13. The display device of claim 12, wherein the pixel electrodes have a function of reflecting external light from a side of the front base layer.

14. A reflective liquid crystal display device comprising:
a liquid crystal layer;

a front base layer and a back base layer which are located on both main surface sides of the liquid crystal layer;

a transparent common electrode supported by the front base layer; and a composite layer supported by the back base layer, which has a function of reflecting external light from a side of the front base layer and a function of driving pixels, the composite layer including: electrically conductive bus-lines which are arranged in matrix and are able to apply voltages for driving the pixels; an insulating layer covering the bus-lines; and pixel electrodes for applying a voltage to the liquid crystal layer for each pixel in accordance with signals supplied to the bus-lines, wherein the pixel electrodes each extend across an entire width of one of the bus-lines via the insulating layer.

15. The display device of claim 14, wherein the bus-lines are formed from a material substantially having optical low reflectivity.

16. The display device of claim 15, wherein the insulating layer is formed from a material which does not substantially have optical direct-reflecting property but substantially has optical non-transmissivity.

17. The display device of claim 14, wherein the insulating layer is formed from a material which does not substantially have optical direct-reflecting property but substantially has optical non-transmissivity.

18. The display device of claim 14, wherein:
the display device further comprises a coat layer stacked on the bus-line via the insulating layer in an area of part of the bus-line, on which the pixel electrodes are not covered; and the coat layer is formed from a material which does not substantially have optical direct-reflecting property but substantially has optical non-transmissivity.

19. A reflective liquid crystal display device comprising:
a liquid crystal layer;

a front base layer and a back base layer which are located on both main surface sides of the liquid crystal layer;

a transparent common electrode supported by the front base layer;

a composite layer supported by the back base layer, which has a function of driving pixels, the composite layer including electrically conductive bus-lines which are arranged in a matrix and are adapted to apply voltages for driving the pixels; and an optically reflective layer disposed on an opposite side of the back base layer as the liquid crystal layer, said optically reflective layer being adapted to reflect external light from a side of the front base layer, wherein the bus-lines are formed from a material substantially having low optical reflectivity and which is substantially optically absorbent or substantially optically scattering.

* * * * *

UNITED STATES PATENT AND TRADEMARK OFFICE
CERTIFICATE OF CORRECTION

| | |
|---|---|
| PATENT NO. | : 7,256,850 B2 |
| APPLICATION NO. | : 10/148046 |
| DATED | : August 14, 2007 |
| INVENTOR(S) | : Toshiya Inada |

It is certified that error appears in the above-identified patent and that said Letters Patent is hereby corrected as shown below:

In the Drawings:

Replace the six (6) sheets of drawings containing Figures 1, 2A, 2B, and 3-6 included in the printed patent with the attached correct six (6) sheets of drawings containing Figures 1-6 as filed with the application.

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,256,850 B2 | Page 1 of 8 |
| APPLICATION NO. | : 10/148046 | |
| DATED | : August 14, 2007 | |
| INVENTOR(S) | : Toshiya Inada | |

It is certified that error appears in the above-identified patent and that said Letters Patent is hereby corrected as shown below:

Delete the Title page and substitute therefor the attached title page.

In the Drawings:

Replace the six (6) sheets of drawings containing Figures 1, 2A, 2B, and 3-6 included in the printed patent with the attached correct six (6) sheets of drawings containing Figures 1-6 as filed with the application.

This certificate supersedes the Certificate of Correction issued November 25, 2008.

Signed and Sealed this

Twentieth Day of January, 2009

JON W. DUDAS
*Director of the United States Patent and Trademark Office*

(12) United States Patent
Inada

(10) Patent No.: US 7,256,850 B2
(45) Date of Patent: Aug. 14, 2007

(54) REFLECTIVE LIQUID CRYSTAL DISPLAY DEVICE

(75) Inventor: Toshiya Inada, Kobe (JP)

(73) Assignee: TPO Hong Kong Limited, Shatin (HK)

(*) Notice: Subject to any disclaimer, the term of this patent is extended or adjusted under 35 U.S.C. 154(b) by 374 days.

(21) Appl. No.: 10/148,046

(22) PCT Filed: Sep. 19, 2001

(86) PCT No.: PCT/EP01/10891

§ 371 (c)(1),
(2), (4) Date: May 24, 2002

(87) PCT Pub. No.: WO02/25360

PCT Pub. Date: Mar. 28, 2002

(65) Prior Publication Data

US 2002/0191132 A1 Dec. 19, 2002

(30) Foreign Application Priority Data

Sep. 25, 2000 (JP) .................. 2000-291114

(51) Int. Cl.
G02F 1/1343 (2006.01)
G02F 1/1335 (2006.01)

(52) U.S. Cl. ............ 349/139; 349/113; 349/138

(58) Field of Classification Search ........ 349/113, 349/138, 139, 110
See application file for complete search history.

(56) References Cited

U.S. PATENT DOCUMENTS 5,408,345 A * 4/1995 Mitsui et al. .................. 349/42

5,682,211 A * 10/1997 Yao et al. .................. 349/38

(Continued)

FOREIGN PATENT DOCUMENTS

EP  1 069 464 A2  1/2001

(Continued)

OTHER PUBLICATIONS

Patent Abstracts of Japan, Oodoi Yuuzou, "Reflection Type Liquid Crystal Display Device," Publication No. 09211493, Aug. 15, 1997, Application No. 08018641, May 2, 1996.

(Continued)

*Primary Examiner*—Toan Ton
(74) *Attorney, Agent, or Firm*—Birch, Stewart, Kolasch & Birch, LLP

(57) ABSTRACT

The object of the invention is to obtain a high contrast ratio and a better aperture ratio. The invention relates to a reflective liquid crystal display device comprises: a liquid crystal layer (3); a front base layer (5) and a rear base layer (1) which are located on both main surface sides of the liquid crystal layer; a transparent common electrode (4) supported by the front base layer (5); and a composite layer (2) supported by the rear base layer (1), which has a function of reflecting external light from a side of the front base layer (5) and a function of driving pixels, the composite layer (2) including electrically conductive bus-lines (22') which are arranged in matrix and are able to apply voltages for driving the pixels. The device is characterized in that the bus-lines (22') are formed from a material having a substantially low optical reflectivity.

19 Claims, 6 Drawing Sheets